United States Patent
Wang et al.

(10) Patent No.: US 7,408,149 B2
(45) Date of Patent: Aug. 5, 2008

(54) DETECTOR HEAD POSITION CORRECTION FOR HYBRID SPECT/CT IMAGING APPARATUS

(75) Inventors: Sharon Xiaorong Wang, Hoffman Estates, IL (US); Joseph Fang, Barrington, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 11/844,901

(22) Filed: Aug. 24, 2007

(65) Prior Publication Data
US 2007/0284517 A1 Dec. 13, 2007

Related U.S. Application Data

(62) Division of application No. 11/091,253, filed on Mar. 28, 2005, now Pat. No. 7,307,252.

(51) Int. Cl.
*G12B 13/00* (2006.01)

(52) U.S. Cl. ................................................ 250/252.1
(58) Field of Classification Search ............... 250/252.1
See application file for complete search history.

(56) References Cited

U.S. PATENT DOCUMENTS

| 6,878,941 B2 | 4/2005 | Balan et al. |
| 2003/0007593 A1 | 1/2003 | Heuscher et al. |
| 2004/0264628 A1 | 12/2004 | Besson |

*Primary Examiner*—Constantine Hannaher
*Assistant Examiner*—Marcus H Taningco

(57) ABSTRACT

A system and method provide for more accurate SPECT/CT image registration. CT data is utilized to establish a global spatial coordinate system of a common test phantom. The common test phantom is then used to obtain a set of point source nuclear images. Three-dimensional CT point source data is mapped to a two-dimensional image plane of corresponding point source data, to obtain a pair of intersecting projection cones that are used to obtain a set of detector head position correction parameters to correct detector head positioning in the CT coordinate system when obtaining SPECT projection images of the same object.

5 Claims, 11 Drawing Sheets

DETECTOR HEAD POSITION CORRECTION FOR HYBRID SPECT/CT IMAGING APPARATUS

CROSS-REFERENCE TO RELATED APPLICATION AND CLAIM FOR PRIORITY

This application is a Division under 35 U.S.C. §§120 and 121 of application Ser. No. 11/091,253 filed Mar. 28, 2005, now U.S. Pat. No. 7,307,252.

BACKGROUND OF THE INVENTION

1. Field of the Invention

This invention relates generally to hybrid nuclear medical imaging, wherein nuclear medical images are co-registered or fused with images of the same region obtained with a different imaging modality, such as Computerized Tomography (CT), Magnetic Resonance Imaging (MRI) and Ultrasound (US). More specifically, this invention relates to improvement in image registration accuracy between nuclear medical images and images obtained with a different imaging modality such as CT, where both modalities are obtained with a single hybrid imaging apparatus.

2. Background and Prior Art

In nuclear imaging, a patient is injected with or swallows a radioactive isotope which has an affinity for a particular organ, structure or tissue of the body. Gamma rays are then emitted from the body part of interest, are collimated by a collimator so that only gamma photons traveling in a direction perpendicular to the surface of a detector head are allowed to impinge on the detector head, and are detected by a gamma camera apparatus including the detector head, which forms an image of the organ based on the detected concentration and distribution of the radioactive isotope within the body part of interest.

Nuclear images may be obtained using single photon emission (either planar or Single Photon Emission Computed Tomography (SPECT)) and Position Emission Tomography (PET). Planar imaging essentially compresses a three-dimensional radiation field onto a two-dimensional image plane, while SPECT and PET produce multiple image "slices," each representing a different plane in a three-dimensional region, such that when the slices are considered collectively, a three-dimensional image of the region may be studied.

Nuclear imaging is particularly suited to studying function and activity of tissue and organs, while other imaging modalities such as CT and MRI are more oriented to providing anatomical and structural information. Consequently, it is particularly useful in certain studies such oncological and cardiology studies to use SPECT or PET imaging for diagnostic purposes, and to align or register the nuclear image with a medical image from another modality such as CT or MRI, which offers better anatomical information. Such a fused image, for example, enables the clinician to determine the anatomical position of a lesion displayed by the nuclear image more accurately, and the organs and structures affected to be ascertained with higher accuracy and confidence.

In recent years there has been considerable interest in development of techniques to co-register or align medical images of different modalities, such as PET and CT images, to thereby combine both functional and anatomical features in a single image. See, e.g., U.S. Pat. No. 6,490,476 to Townsend et al. In particular, techniques such as landmark registration or external marker registration are generally known in the art. Such techniques require either a significant amount of human interpretation of two separate images or require the use of external markers attached to the patient while two different imaging procedures are performed.

Recently, Siemens Medical Solutions introduced a new concept in hybrid imaging technology known as TruePoint™ SPECT-CT, which combines the functional sensitivity of SPECT with the anatomical detail of diagnostic multi-slice CT in a single imaging apparatus, thereby providing clinicians with imaging clarity as well as diagnostic confidence. Such hybrid imaging technology allows the capture of comprehensive, accurate diagnostic information on both the molecular and anatomical levels, within a single scan procedure.

In addition to the dual modality capability that enables SPECT attenuation correction and SPECT/CT image overlay, another significant advantage of the hybrid system platform (known as Symbia™) is a versatile mechanical system that allows the detectors to scan at optimal positions for various studies, such as cardiology studies.

The challenges involved in SPECT/CT image registration have among their causes the difference in resolution between CT images and SPECT images. In particular, the resolution of a CT image and its geometrical accuracy are high, while the resolution of a SPECT image is comparatively low, and the geometrical distortion of the SPECT image has historically received less attention. This mismatch in resolution between the two modalities is one cause of inaccuracy in image registration of the images produced by the different modalities.

Among the various factors that cause SPECT image distortion, detector head deflection and alignment issues are among the largest sources of error. The more versatile mechanical system of the Symbia™ platform amplifies the potential for errors because it introduces the capability for new detector positions and accordingly the conventional projection geometry assumptions used in image reconstruction are no longer applicable, leading to potential for image blurring and distortion. Examples of such head deflection and misalignment errors are shown in FIGS. 8($a$)-8($c$) and FIGS. 9($a$)-9($b$).

While one way to reduce such problems is mechanical measurement of the detector heads, such a procedure is costly and still cannot eliminate the errors caused by the electronics and other system factors.

Accordingly, there exists a need in the art for improvement in correction of projection image positional errors in order to improve the accuracy and quality of such images when used in SPECT/CT image overlays.

SUMMARY OF THE INVENTION

The present invention provides a novel system and method for more accurate SPECT/CT image registration, and which simultaneously solves the detector head deflection problems. The present invention provides a solution to the projection correction problem by utilizing CT data to establish a global spatial coordinate system of a common test phantom. The common test phantom is then used to obtain a set of point source nuclear images. Gaussian peaks are fitted to each point source for each frame of projection data, to obtain a set of projected centroid data. A pair of cones is then generated by using the geometric correspondence between the three-dimensional centroids and their projections on the two dimensional image plane. Among the two bundles of intersecting lines from the generated pair of cones, one pair of lines will form an angle that is equal to the angle between the projections. This pair of lines is then determined, which yields the normal of the detector plane. This normal is then used for solving five correction parameters for each view angle.

The correction parameters are used to offset displacements of the detector head during rotation around a subject, as well to correct misalignments in the two-dimensional image plane of the detector head with respect to the fixed coordinate system of the CT imaging modality of the hybrid system.

BRIEF DESCRIPTION OF THE DRAWINGS

The present invention will become more fully understood from the detailed description given herein below and the accompanying drawings which are given by way of illustration only, and are not limitative of the present invention, and wherein.

DETAILED DESCRIPTION OF THE PREFERRED EMBODIMENTS

According to the present invention, a test phantom is provided with a number of radioisotope point sources, and is imaged with both CT and SPECT modalities. For the CT test data, two images are taken of the phantom: one with blank point sources and another with loaded point sources. The difference between these two images will then represent only the point source locations in three-dimensional space. The three-dimensional space is defined by a fixed coordinate system.

The phantom with loaded point sources is then subjected to SPECT imaging over an entire range of projection view angles. For each view angle, centroids are calculated for the point sources, using a coordinate system that is attached to the detector heads, and thus is moving with respect to the fixed coordinate system.

These two sets of test data then are used to calculate detector head position correction parameters for each different view angle of the SPECT procedure. The detector correction parameters then are used to correct the positioning of the detector head during a SPECT procedure so that projection data obtained from the SPECT procedure will be more accurately aligned with CT data of the same region, and therefore will allow more accurate image registration and overlay of the SPECT images with the CT images.

Figure 1:
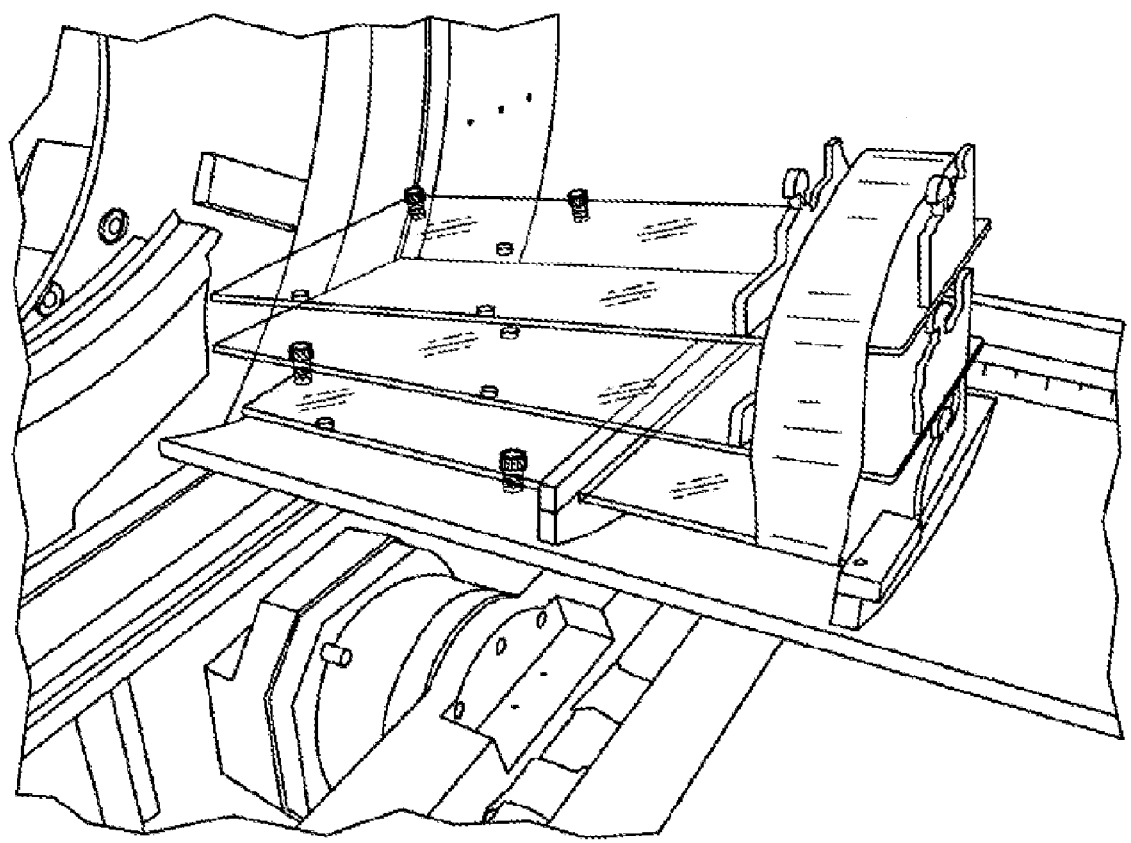
FIG. 1 is a perspective view of a test phantom according to one embodiment of the present invention.
Figure 2:
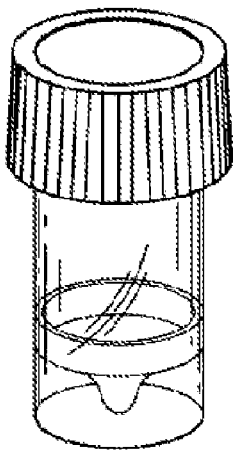
FIG. 2 is a view of a point source isotope container according to one embodiment of the invention.

FIG. 1 shows a prototype FWC (FirmWare Correction) phantom, having four Tc99 point sources (which are indicated by arrows). Each point source can be implemented using a capsule as shown in FIG. 2. The capsule can be made of any appropriate material, such as plastic.

As shown, the phantom is mounted on a patient bed that is used to obtain both SPECT and CT data with the single hybrid imaging apparatus. The patient bed moves during a CT scan and remains stationary during a SPECT scan. The phantom is provided with capsule holders, such as wells or holes, in which the point source capsules are mounted. The four point source locations are arranged such that any pair of lines connecting pairs of point sources will be skewed. This geometry ensures that the four points cannot be degraded to a single line in any view angle, and avoids any singularity as would be generated by a MHR (Multi-Head Registration) phantom. Consequently, the FWC phantom can provide stable and accurate correction results for any detector head configuration.

Figure 3:
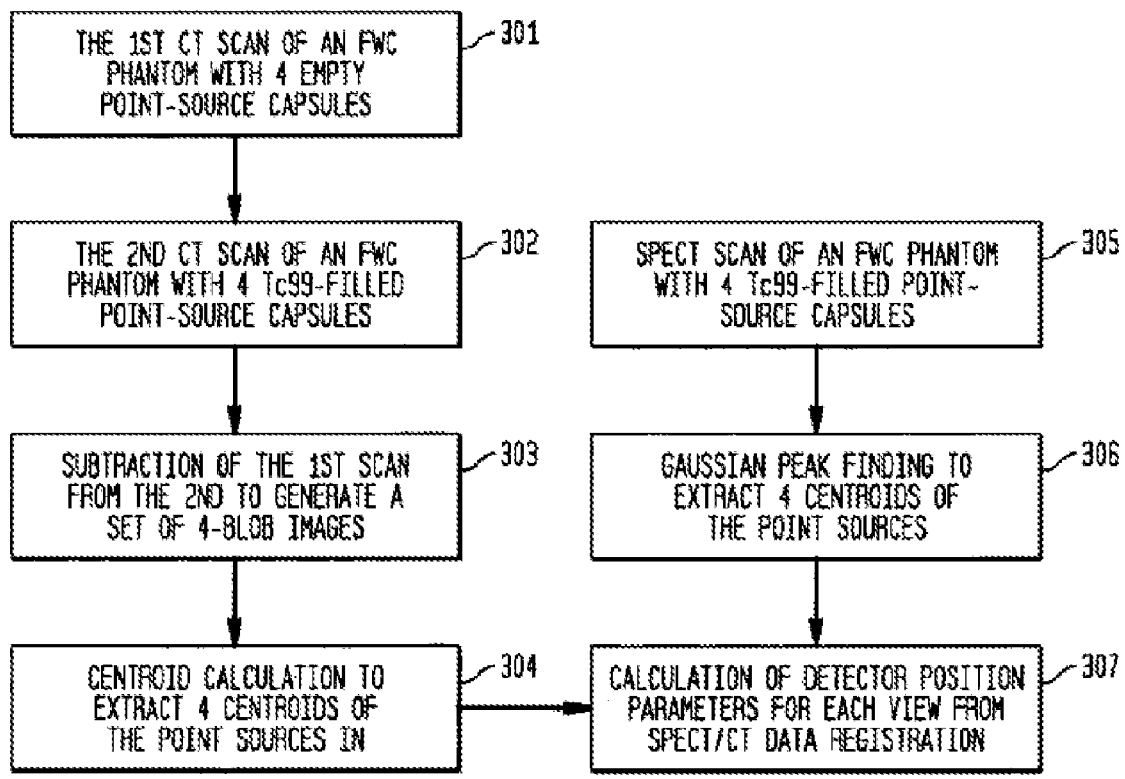
FIG. 3 is a flow diagram of a detector head position error correction calculation procedure according to one embodiment of the present invention.

FIG. 3 illustrates a flow diagram of one procedure for generation of correction parameters according to the present invention. At step 301, empty point source capsules are placed in the capsule holders of the FWC phantom, and a first CT scan of the phantom is performed. Next, at step 302, the empty point source capsules are replaced with point source capsules that are loaded or filled with a Tc99 isotope, and a second CT scan is carried out on the phantom. These two scans result in two images of the same phantom structure, except for the isotope. Then, at step 303, the CT scan data of the first scan is subtracted from the CT scan data of the second scan, thereby obtaining a residual image of only the four point sources of isotope. Application of a threshold results in four CT "blobs." At step 304, the CT blobs are used as inputs for extraction of centroid position coordinates of the four point sources in 3D space. These point sources are visible as the tiny dots in FIG. 10.

Figure 10:
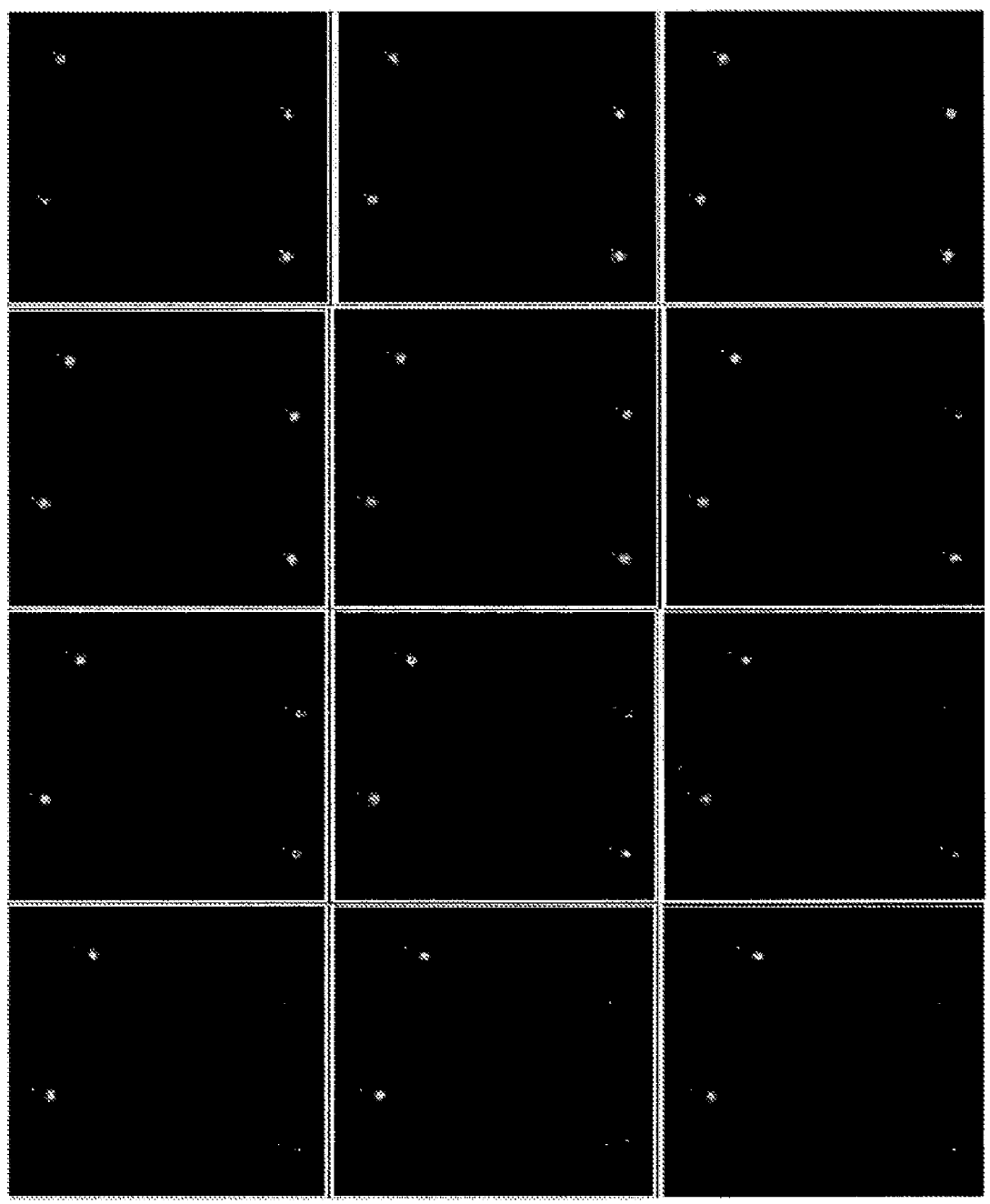
FIG. 10 shows a series of uncorrected tomographic test images overlaid with CT test data.

At this time, at step 305 the FWC phantom with loaded point source capsules is moved to the nuclear medicine position, and a SPECT scan of the phantom is carried out with small rotation angle steps, to acquire a set of tomographic projection data. At step 306, a Gaussian peak-fitting algorithm is used to extract centroids for the four isotope point sources at each view angle. The SPECT centroids are visible in FIG. 10 as the larger dots. The misalignment between the CT centroids (small dots) and SPECT centroids (large dots) as shown in FIG. 10 will be noted. It is this misalignment that is corrected in accordance with the present invention.

At step 307, a set of five detector head position correction parameters is calculated for each view angle, from the CT and SPECT centroid data. The result is a complete set of detector head position parameters that can be used for projection correction and image reconstruction. The particulars of one method of parameter calculation will be discussed below, with reference to FIG. 7.

Figure 4:
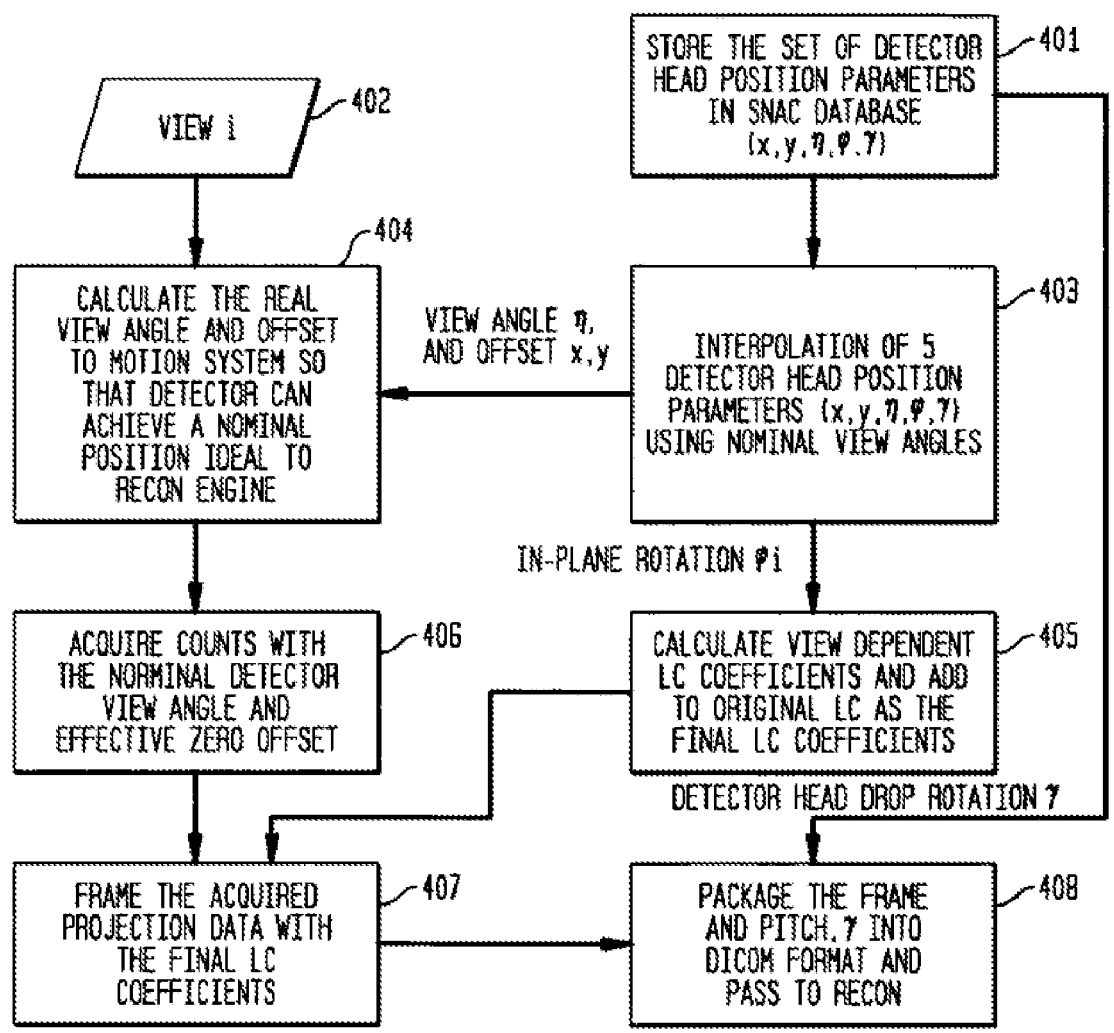
FIG. 4 is a flow diagram of a SPECT sonogram correction procedure according to one embodiment of the present invention.

FIG. 4 shows a flow diagram of a SPECT sonogram data correction procedure according to one embodiment of the invention. At step 401, the sets of detector head position correction parameters are first stored in a SNAC (Simple Numeric Algebraic Calculation) database. As shown, for each projection view angle, position parameters of $(x, y, \gamma, \eta, \phi)$ are stored, where x and y are displacements along the X- and Y-axes of the defined coordinate system, and γ, η, φ are angles defined along the X-, Y- and Z-axes respectively. At step 402, a request for the acquisition of a frame of projection data at a view i is sent to the SNAC processor. At step 403, a set of position parameters is retrieved from the database and interpolated according to the nominal view angle of the requested projection view. At step 404, the offset parameters x, y and the actual view angle η are used to generate a set of motion parameters for the detector head motion system, which uses the generated motion parameters to move the detector head to a position that enables the best achievable image reconstruction.

Next, at step 405 the in-plane rotation angle $\phi_i$ is used to calculate an additional set of view angle-dependent linearity correction (LC) coefficients, which are added to the original LC coefficients (which are obtainable in a number of different ways as known to those skilled in the art, and therefore will not be further described here) to obtain a final set of LC coefficients. At step 406, scintillation events are detected and counts acquired with the nominal detector head view angle and effectively zero offset. Next, at step 407 the acquired projection data is corrected using the final LC coefficients as developed from step 405, to correctly frame the acquired projection data. Finally, at step 408 the correctly framed projection data is formatted along with the detector head pitch angle γ into a standardized format, such as the well-known DICOM (Digital Imaging and Communications in Medicine) format, and fed to the reconstruction engine.

Figure 5:
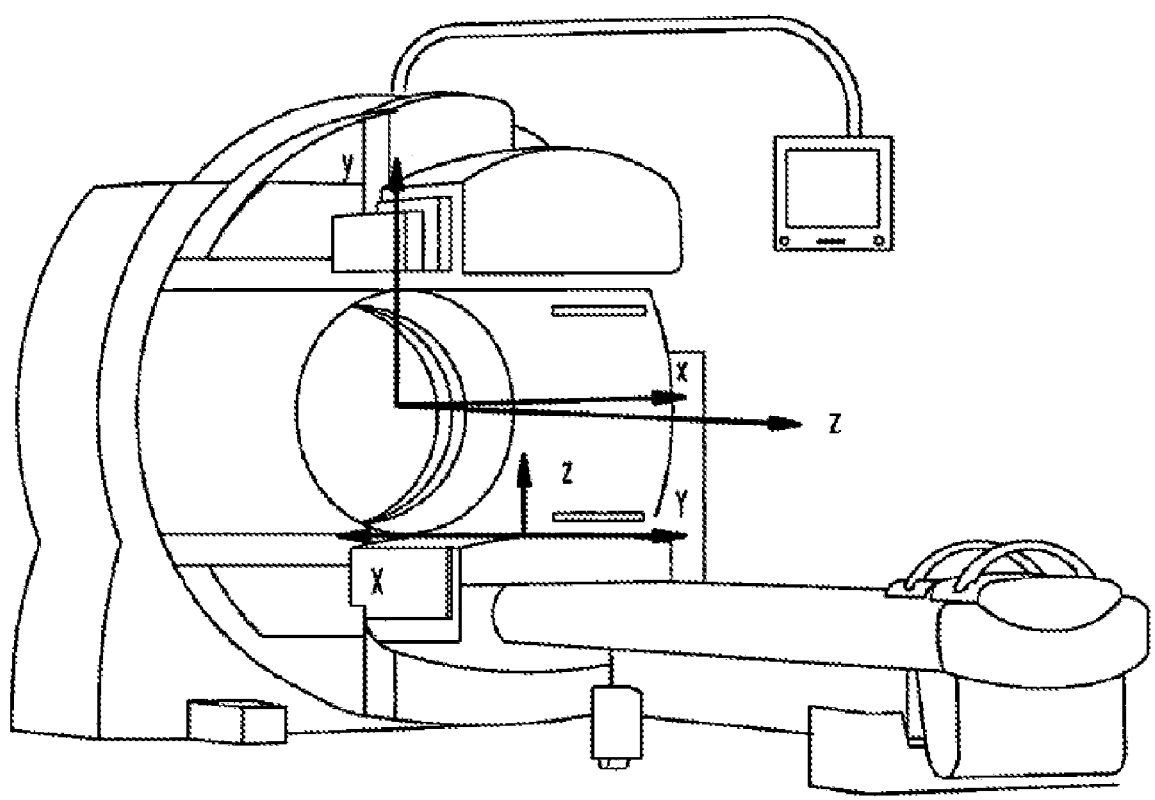
FIG. 5 is a perspective view of a hybrid imaging system showing the orientation of fixed and moving coordinate systems in accordance with the concepts of the present invention.

FIG. 5 illustrates the coordinate systems used in computations according to the invention. A fixed coordinate system o-xyz is used for CT data, and a moving coordinate system O-XYZ is attached to the detector heads and is used for SPECT scan data. The fixed coordinate system is defined as having its z axis pointing out of the gantry, with its y axis pointing upwards. The x axis orientation then is determined using the right-hand rule. The moving coordinate system is defined as having X and Y axes respectively along the long and short dimensions of the detector head, with the Z axis always pointing toward the center of gantry rotation.

Figure 6:
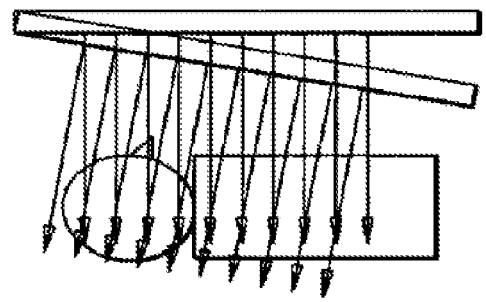
FIG. 6 is a diagram illustrating detector head pitch error, which is corrected by the present invention.

The problem to be solved is to determine five detector head position parameters, which can be used to correct sonogram (i.e., SPECT) data, and passed on to the image reconstruction engine. The five parameters can be written as the following displacement vector d:

$$d=\{dX,dY,\gamma,\eta,\phi\} \qquad (1)$$

where dX and dY are displacements along the X and Y axes respectively, while {γ, η, φ} are the angles defined along X, Y, and Z axis, respectively. It should be pointed out that the γ angle is a misalignment that can be corrected only in the reconstruction process and is relatively difficult; however the other four parameters can be corrected easily in either sonogram data or in a projection header. The reason that the γ angle has to be corrected in reconstruction (as opposed to being corrected during acquisition) is depicted in FIG. 6. Since the SPECT data received by the detector are line integrals along the photon path, they must be projected on the same path in both the forward and backward projection processes, and as such the angle of the detector cannot be corrected for the γ offset by being moved during acquisition, as shown in FIG. 6.

Figure 7A:
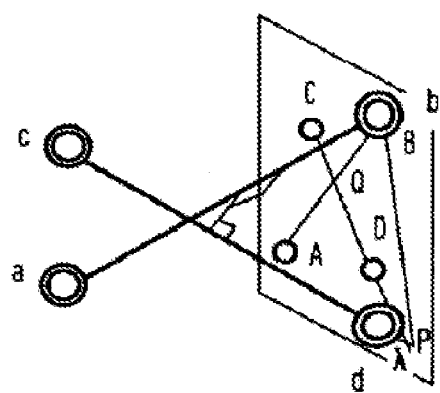
FIGS. 7A-B are diagrams illustrating the "twin cone" projection method for solving detector head pitch errors in accordance with the present invention.
Figure 7B:
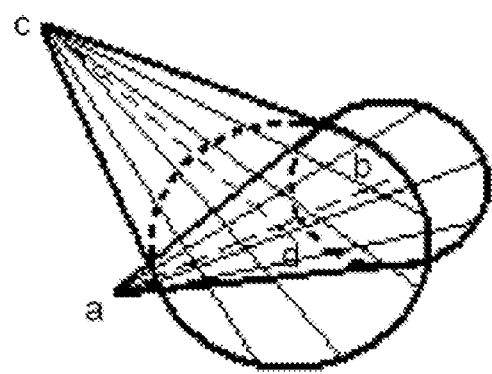

One solution to the problem can be described with reference to FIGS. 7A-B. In FIG. 7A, four points extracted from the CT image of the calibration phantom are marked as points a, b, c, and d, while their projection on the detector image plane are at points A, B, C, and D respectively. First, the detector plane is moved along its normal until image plane point B coincides with 3D point b. Since the angle between lines ab and AB can be determined, rotating line AB around line ab forms a cone, as can be seen in FIG. 7B. Then, lines CD and cd are extended to a point of intersection P on the detector plane. The same cone generating process is repeated by rotating line CD around line cd at the fixed angle between them, to thereby generate another cone, as can be seen in FIG. 7B. Because the phantom is constructed in such a way that the two cones intersect, among the intersection points there must exist at least one pair of line generators on the cones having an angle between them that is the same as the angle between the two projections. This pair of generators on the cones thus determines the corrected detector plane angle. The process now will be explained in detail.

In the following, vectors in the fixed 3D coordinate system are denoted with lowercase letters and vectors in the moving 2D coordinate system are denoted with uppercase letters. Then, point P in the 3D coordinate system can be expressed as $$\vec{r}_p = \vec{r}_e + \lambda \vec{v}_{cd} \qquad (2)$$

where λ is the length from P to D and $\vec{v}_{cd}$ represents a unit vector in the direction from point C to point D.

It is seen on the detector plane that cosine law holds for ΔQBP as $$(\vec{r}_p - \vec{r}_b)^2 = \vec{R}_{BQ}^2 + \vec{R}_{PQ}^2 - 2\vec{R}_{BQ}\vec{R}_{PQ}\cos\alpha \qquad (3)$$

where angle α is the angle between BQ and PQ. Here, it is seen that $$|\vec{R}_{DP}| = \cos\beta_{cd} |\vec{r}_{dp}| \qquad (4)$$

where $\beta_{cd}$ is the angle between line cd and line CD. Substituting Equations (2) and (4) into (3), there is only one unknown λ and it can be solved as a quadratic equation.

Next, from the following three equations:

$$\vec{r}_{cd} \cdot \vec{r}_{QP} = \cos\beta_{cd} |\vec{r}_{cd}| |\vec{R}_{QP}| \qquad (5)$$

$$\vec{r}_{ab} \cdot \vec{r}_{QB} = \cos\beta_{ab} |\vec{r}_{ab}| |\vec{R}_{QB}| \qquad (6)$$

$$\vec{r}_{QP} \cdot \vec{r}_{QB} = \cos\alpha |\vec{r}_{QP}| |\vec{R}_{QB}| \qquad (7)$$

the coordinates $\vec{r}_p = \{x_p, y_p, z_p\}$ that consist of three unknowns can be solved. And the normal of the detector plane then can be expressed as $$\vec{n} = \vec{r}_{QP} \times \vec{r}_{QB} \qquad (8)$$

which gives three rotation parameters in d. The displacement in d then can be written as $$dX = x_b - X_B, \quad dY = y_b - Y_B \qquad (9)$$

The process solving for d also can be formulated as an optimization process. The transformation from o-xyz to O-XYZ is denoted as matrix A. Then the objective function can be written as $$F(\vec{n}) = \Sigma(A\vec{r}_i - \vec{R}_i + \vec{D})^2, \quad i=a,b,c,d \qquad (10)$$

where $$\vec{D} = \{dX, dY\}.$$

Figure 8A:
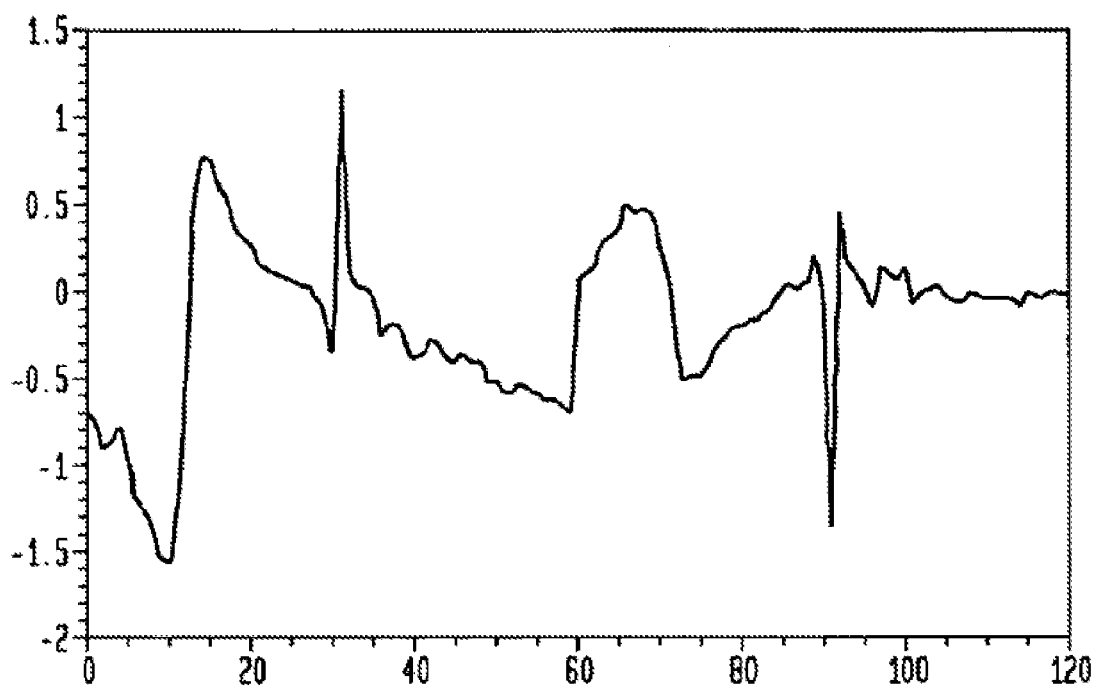
FIGS. 8(a)-8(c) are charts showing detector head position rotation errors, which are compensated by the present invention.
Figure 8B:
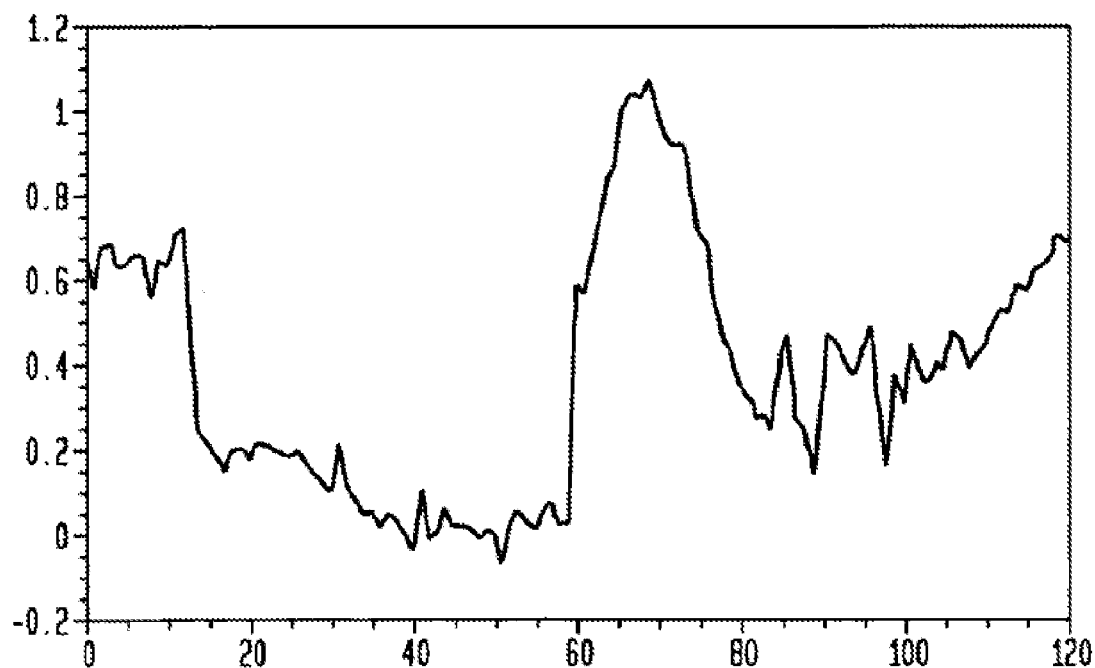
Figure 8C:
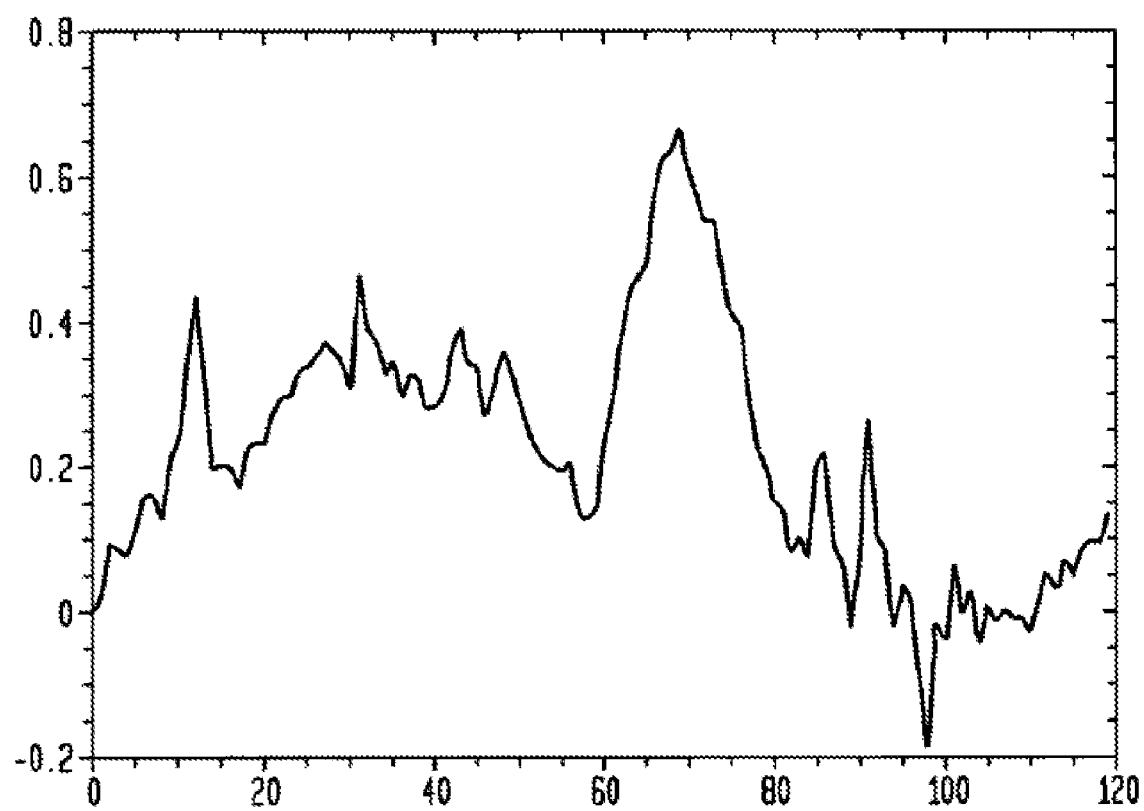

The results achieved by the present invention are shown in the following figures. FIGS. 8(*a*), (*b*) and (*c*) describe the rotation errors calculated from the Symbia FG6 two detector head system, along the Y, X and Z axes respectively. In these figures, the vertical axes indicate the rotation error in degrees while the horizontal axes indicate the view angle numbers. Head 1 started from 0° at View 1 and ended at 177° at View 59. Head 2 started from 180° at View 60 and ended at 357° at View 119. The view angle step is 3°. It can be seen that the errors around the Y axis (roll) are in a range of about 3° (i.e., from −1.5° to 1.5°); the error range in the X axis (pitch) is about 1.1°; and the error range in the Z axis is about 0.9°. All three ranges of detector alignment error are significant enough to negatively impact the image quality of the reconstructed SPECT images.

Figure 9A:
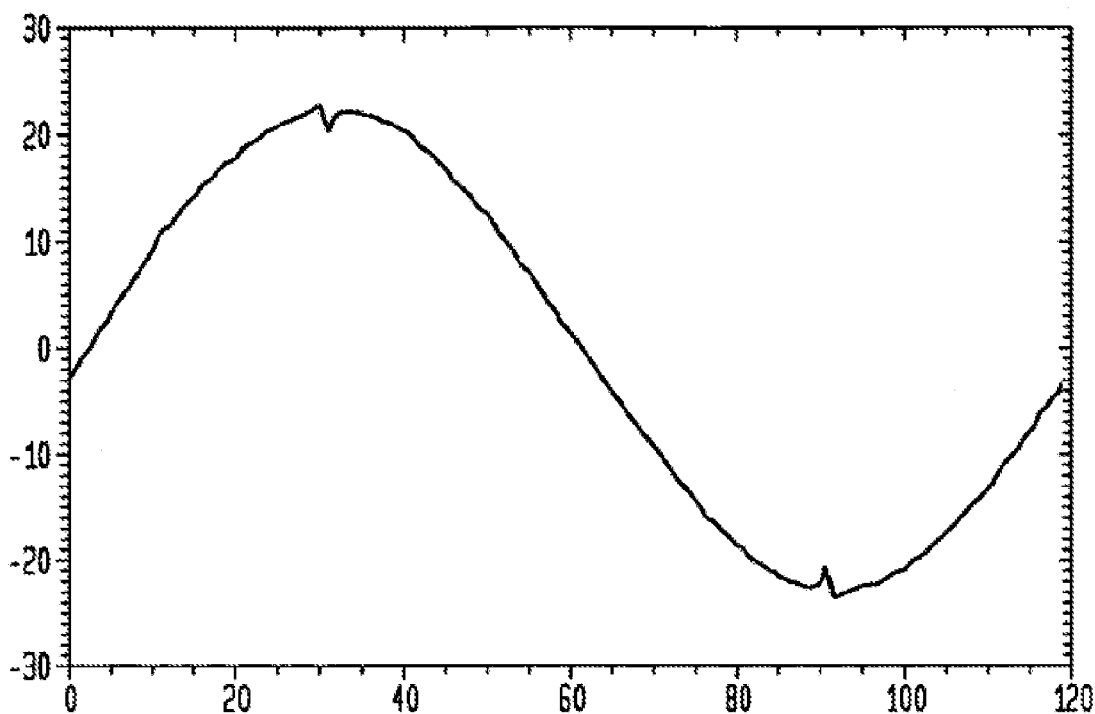
FIGS. 9(a)-9(b) are charts showing detector head position translation errors, which are compensated by the present invention.
Figure 9B:
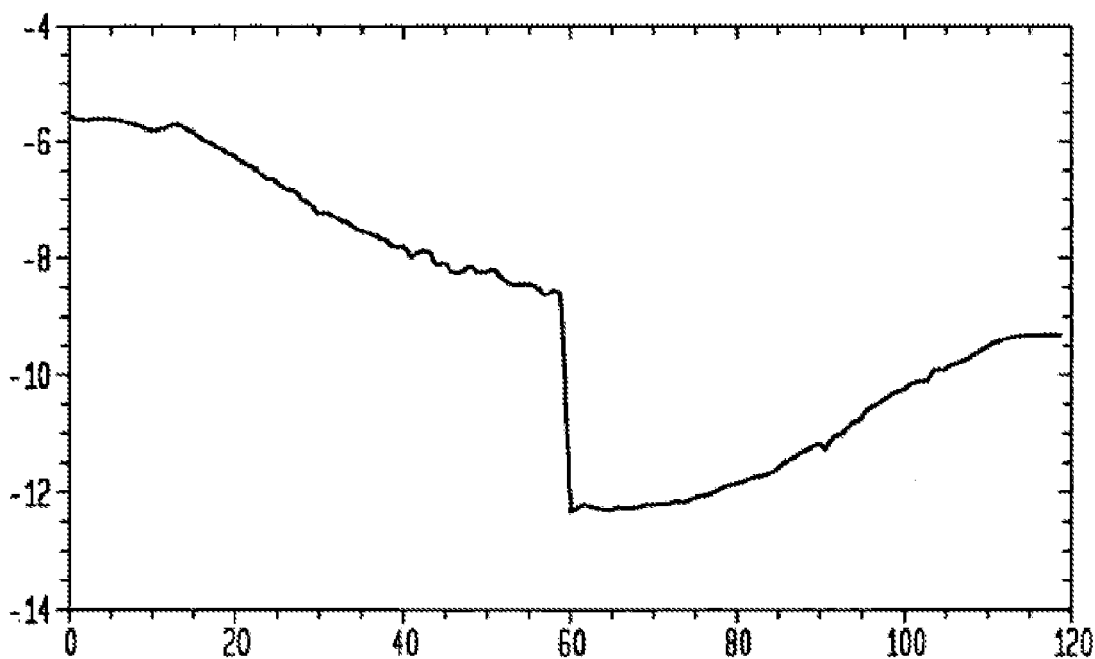

FIGS. 9(*a*) and 9(*b*) illustrate the measured displacement errors of the rotating coordinate system in dX and dY respectively. The vertical axes units are in millimeters, and the horizontal axes are defined in the same way as in FIGS. 8(*a*)-8(*c*). It is seen that the error range for dY is on the order of 6 mm, while the error range for dX is about 45 mm.

FIG. 10 is an overlay image that shows the disparity between an ideal projection without detector head position errors versus a real projection with detector head position errors, for a number of different view angle projections. The tiny white dots indicate the Tc99 capsule centroids calculated from the CT phantom images that established true 3D locations, while the larger blob-like dots represent the centroids calculated from the SPECT projection data of the phantom.

Figure 11:
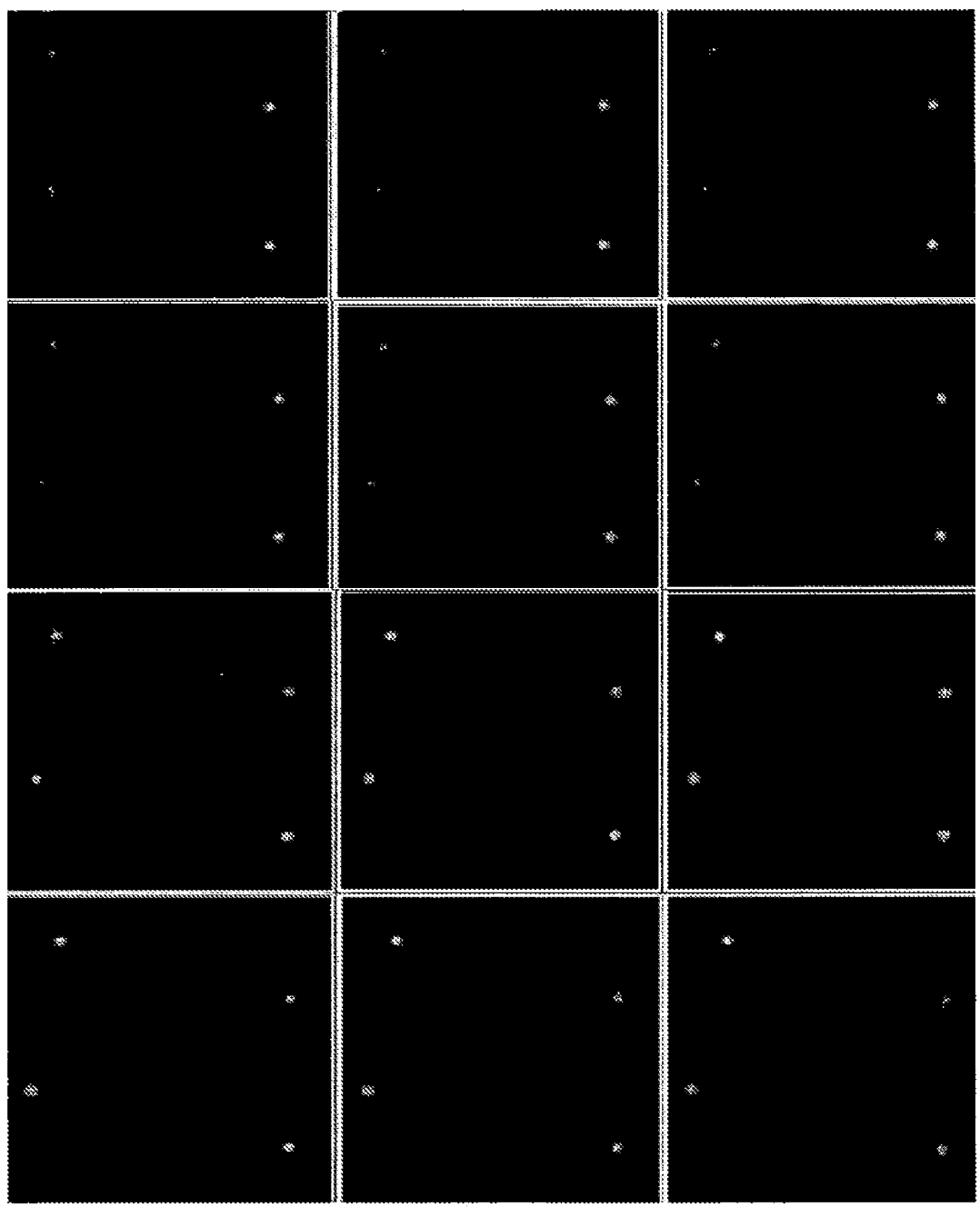
FIG. 11 shows a series of tomographic test images corrected in accordance with the concepts of the present invention, as overlaid with CT test data.

FIG. 11 shows the overlay image of the Tc99 point source centroids with the corrected projection data in accordance with the concepts of the present invention, for a number of different view angle projections. It can be seen that all of the tiny white dots (CT calculated point source centroids) are located at the center of the SPECT projection data of the point sources.

Figure 12:
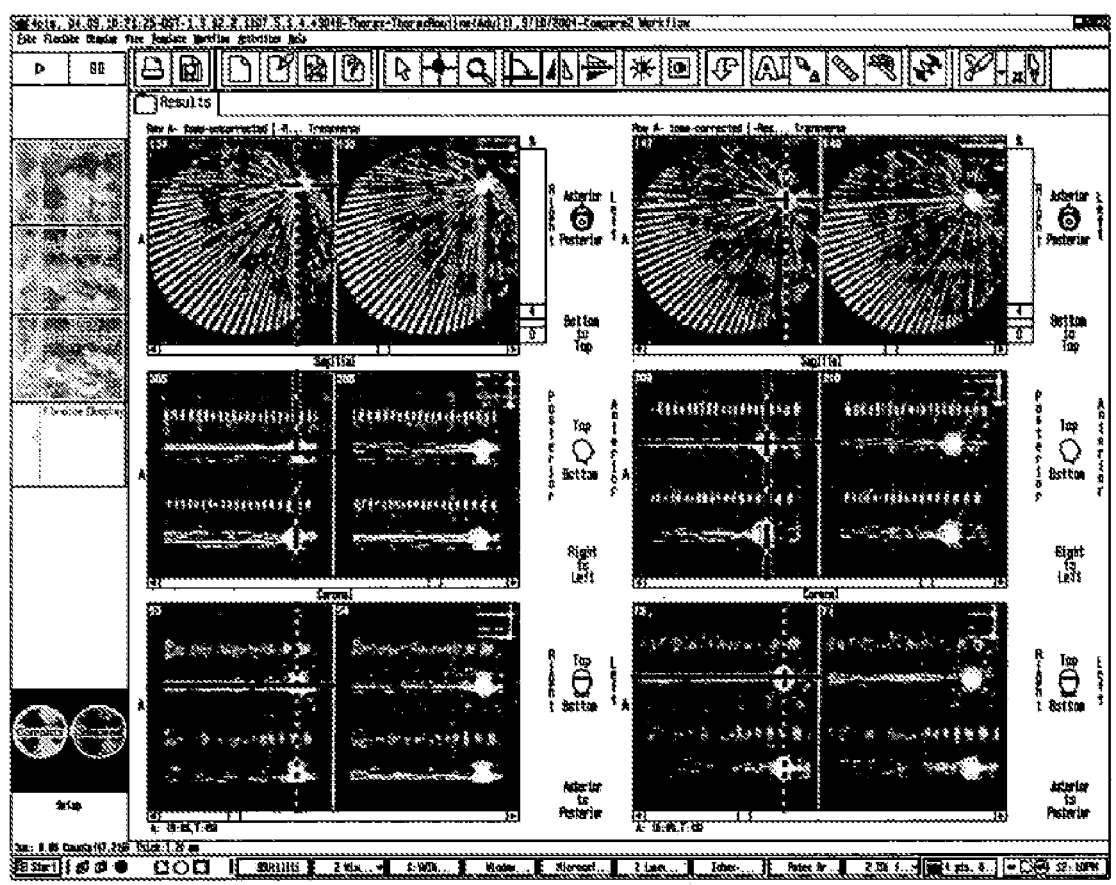
FIG. 12 shows a side-by-side comparison of projection image reconstructions, with and without detector head position correction as taught by the present invention.

FIG. 12 is a display of reconstructed images with and without projection correction, which illustrates the impact of the correction according to the present invention. Both columns of images are reconstructed from the same dataset using the filter back-projection method. The right hand column data is corrected data, while the left hand column is uncorrected data. The improvement in image quality and accuracy with the correction according to the invention is clearly visible.

According to the features of the invention as disclosed above, a number of advantages are realized, including:

1) Reconstruction of images after correction according to the invention will be sharper and less distorted;
2) The correction process according to the invention may replace up to four conventional calibration processes, including Multi-Head Registration (MHR), Center of Rotation (COR) calibration, Non-Circular Rotation (NCR) calibration, and SPECT/CT FOV (Field of View) calibration, thereby saving from 1 to 2 hours of calibration time.
3) According to the concepts of the invention, any flat panel detector position and orientation in three-dimensional space may be measured, including high-resolution semiconductor detectors. The correction procedure also can be used for more versatile detector supporting devices such as C-cam or robot arms.

The invention having been thus described, it will be obvious to those skilled in the art that the same may be varied in many ways without departing from the spirit and scope of the invention.

For example, while the invention has been described with respect to SPECT/CT, various different modality pairs may be also applicable, such as SPECT/MRI, SPECT/Ultrasound, PET/CT, PET/MRI, PET/Ultrasound, etc. Additionally, while a test phantom using four point sources has been described, the number of point sources may be varied to more or less than four, and their spatial relationships also may be varied, in order to obtain an optimal configuration for detector head calibration purposes as taught by the present invention. Any and all such modifications are intended to be included within the scope of the following claims.

What is claimed is:

1. A method of correcting a SPECT projection image of an object obtained by a nuclear medical imaging apparatus to provide for accurate registration of said SPECT projection image with a three-dimensional CT image of the same object, comprising the steps of:

storing a set of detector head position correction parameters for each of a plurality of predetermined image view angles;

retrieving detector head position correction parameters corresponding to a specific view angle of said SPECT projection image, with respect to said CT image;

adjusting a position of a detector head of said nuclear medical imaging apparatus in accordance with retrieved detector head position correction parameters;

calculating view angle-dependent linearity correction coefficients in accordance with a retrieved detector head position correction parameter;

acquiring SPECT projection image counts from said object with said detector head positioned at said adjusted position; and framing resulting SPECT projection image data in accordance with said view angle-dependent linearity correction coefficients.

2. The method of claim 1, further comprising the step of adding said view angle-dependent linearity correction coefficients to originally obtained linearity correction coefficients to obtain final linearity correction coefficients, and wherein said framing step utilizes said final linearity correction coefficients.

3. The method of claim 1, further comprising the step of packaging a frame of resulting SPECT projection image data into a DICOM format along with a selected one of said detector head position correction parameters, for input to an image reconstruction engine.

4. The method of claim 1, wherein the step of retrieving further includes the step of interpolating retrieved detector head position correction parameters to correspond to said specific view angle.

5. The method of claim 1, wherein said detector head position correction parameters map two-dimensional SPECT image data to a three-dimensional coordinate system of said CT image.

* * * * *